(12) United States Patent
Kanai

(10) Patent No.: US 6,990,234 B2
(45) Date of Patent: Jan. 24, 2006

(54) CORRECTION CURVE GENERATING METHOD, IMAGE PROCESSING METHOD, IMAGE DISPLAY UNIT, AND STORAGE MEDIUM

(75) Inventor: Masashi Kanai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 762 days.

(21) Appl. No.: 09/949,998

(22) Filed: Sep. 12, 2001

(65) Prior Publication Data

US 2002/0094123 A1 Jul. 18, 2002

(30) Foreign Application Priority Data

Sep. 13, 2000 (JP) .......................... P2000-278335

(51) Int. Cl.
*G06K 9/00* (2006.01)
*G03B 21/00* (2006.01)
*H04N 5/64* (2006.01)

(52) U.S. Cl. .................. 382/167; 353/31; 348/744
(58) Field of Classification Search ................ 382/162, 382/167, 274, 275, 254, 312; 353/31, 37, 353/79, 82; 348/177, 655, 744, 761; 345/87, 345/418
See application file for complete search history.

(56) References Cited

U.S. PATENT DOCUMENTS

| | | | | |
|---|---|---|---|---|
| 5,200,815 A | * | 4/1993 | Tsujihara et al. ............ | 348/181 |
| 5,231,431 A | * | 7/1993 | Yano et al. ..................... | 353/31 |
| 5,287,173 A | * | 2/1994 | Onuma et al. ................ | 348/655 |
| 5,293,224 A | | 3/1994 | Ajima | |
| 5,315,378 A | | 5/1994 | Satou et al. | |
| 5,345,262 A | * | 9/1994 | Yee et al. .................... | 348/177 |
| 5,473,339 A | * | 12/1995 | Kanatani et al. .............. | 345/87 |
| 6,115,022 A | * | 9/2000 | Mayer et al. ................ | 345/418 |
| 6,439,724 B1 | * | 8/2002 | Jeon et al. ..................... | 353/31 |

FOREIGN PATENT DOCUMENTS

| | | |
|---|---|---|
| JP | 04-136925 | 5/1992 |
| JP | 08-115067 | 7/1996 |

OTHER PUBLICATIONS

Patent Abstracts of Japan, Publication No. 06098346, Apr. 8, 1994.
Patent Abstracts of Japan, Publication No. 09084036, Mar. 28, 1997.

* cited by examiner

*Primary Examiner*—KanjiBhai Patel
(74) *Attorney, Agent, or Firm*—Lowe Hauptman & Berner, LLP

(57) ABSTRACT

In an image display unit which applies a desired image processing to inputted image data and then displays the processed image, reflection characteristics for each color component of an output provided from the image display unit and reflected by a predetermined projection plane and by a reference projection plane are measured. Further, a correction curve is generated for correcting the inputted image data so as to eliminate a difference between the measured reflection characteristics for each color component reflected by the predetermined projection plane and by the reference projection plane. With the correction curve, an image processing is performed for the image data inputted to the image display unit, taking into account the characteristic of the projection plane on which an output from the image display unit is projected.

32 Claims, 13 Drawing Sheets

CORRECTION CURVE GENERATING METHOD, IMAGE PROCESSING METHOD, IMAGE DISPLAY UNIT, AND STORAGE MEDIUM

BACKGROUND FOR INVENTION

1. Field of Invention

The present invention relates to a correction curve generating method, an image display method, an image display unit, and a storage medium, capable of correcting the influence of an external environment on output image.

2. Description of the Related Art

In case of using an image display unit such as a projector, it is important that an image intended by a producer be reproducible even if an external environment such as illumination in a room or a screen changes As such a way of thinking of adjusting the visibility of image, there is known a way of thinking called color management in which input and output characteristics of a device are managed to reproduce color. But a concrete color management method taking changes of a working environment into account has not been made clear. Particularly, in a projection type image display unit such as a liquid crystal projector, if a projection plane such as a screen differs, the color of projected image changes according to the color of the projection plane, with consequent change in the visibility of projected image. Thus, as a change of environment it is necessary that the case where the color of a projection plane changes be taken into account, or else it would be difficult to make an appropriate color reproduction. For example, even in case of displaying the same white, the displayed white may look somewhat yellowish, depending on the type of a projection plane used.

SUMMARY OF INVENTION

The present invention has been accomplished for solving the above-mentioned problem and it is an object of the invention to provide a correction curve generating method, an image processing method, an image display unit, and a storage medium, capable of making an appropriate color reproduction even with a change in color of a projection plane.

The present invention as described in claim 1, is a method for generating a correction curve for correcting image data inputted to an image display unit, taking into account characteristics of a projection plane on which an output from the image display unit is projected, the method including: a measuring step of measuring a reflection characteristic for each color component of an output provided from the image display unit and reflected by a predetermined projection plane and a reflection characteristic for each color component of the output provided from the image display and reflected by a reference projection plane; and a correction curve generating step of generating a correction curve for correcting the inputted image data so as to eliminate a difference between the measured reflection characteristic for each color component reflected by the predetermined projection plane and a reflection characteristic for each color component reflected by a reference projection plane.

According to the thus constructed method for generating a correction curve for correcting image data inputted to an image display unit, taking into account characteristics of a projection plane on which an output from the image display unit is projected, a reflection characteristic for each color component of an output provided from the image display unit and reflected by a predetermined projection plane and a reflection characteristic for each color component of the output provided from the image display and reflected by a reference projection plane are measured by a measuring step Therefore, a correction curve for correcting the inputted image data so as to eliminate a difference between the measured reflection characteristic for each color component reflected by the predetermined projection plane and a reflection characteristic for each color component reflected by a reference projection plane are generated by a correction curve generating step.

The present invention as described in claim 2, is an image processing method for image data inputted to an image display unit, taking into account characteristics of a projection plane with an output from the image display unit projected thereon, wherein the method corrects input image data by using a correction curve for eliminating a difference between a reflection characteristic for each color component of an output provided from the image display unit and reflected by a predetermined projection plane and a reflection characteristic for each color component of the output provided from the image display and reflected by a reference projection plane.

The present invention as described in claim 3, is an image processing method according to claim 2, which uses a plurality of correction curves for a plurality of projection planes.

The present invention as described in claim 4, is an image processing method according to claim 2, wherein the amount of correction of input image data corrected by the correction curve(s) is adjustable.

The present invention as described in claim 5, is an image processing method according to claim 2, wherein the correction curve(s) is subjected to a rounding process in a high graduation region.

The present invention as described in claim 6, is an image processing method according to claim 5, wherein the degree of the rounding process is adjustable.

The present invention as described in claim 7, is an image processing method according to claim 3, including a selection step of selecting one correction curve from among the plural correction curves on the basis of a reflection characteristic for each color component reflected by a projection plane, and wherein an image processing is performed for input image data on the basis of the selected correction curve.

According to the present invention as described in claim 8, an image processing method according to claim 7, further includes a step of inputting the reflection characteristic for each color component reflected by the projection plane in the selection step.

According to the present invention as described in claim 9, an image processing method according to claim 7, further includes a step of measuring the reflection characteristic for each color component reflected by the projection plane in the selection step.

The present invention as described in claim 10, is an image display unit for performing an image processing for an inputted image data, taking into account characteristics of a projection plane, wherein the image display unit corrects input image data by using a correction curve for eliminating a difference between a reflection characteristic for each color component of an output provided from the image display unit and reflected by a predetermined projection plane and a reflection characteristic for each color component of the output provided from the image display and reflected by a reference projection plane.

The present invention as described in claim 11, is an image display unit for performing an image processing for an inputted image data, taking into account characteristics of a projection plane, wherein the image display unit performs the image processing for the inputted data based on a correction curve, which is sequentially generated by sequentially repeating a method for generating the correction curve including: a measuring step of measuring a reflection characteristic for each color component of an output provided from the image display unit and reflected by a predetermined projection plane and a reflection characteristic for each color component of the output provided from the image display and reflected by a reference projection plane; and a correction curve generating step of generating a correction curve for correcting the inputted image data so as to eliminate a difference between the measured reflection characteristic for each color component reflected by the predetermined projection plane and a reflection characteristic for each color component reflected by a reference projection plane.

The present invention as described in claim 12, is an image display unit according to claim 10, which uses a plurality of correction curves for a plurality of projection planes.

The present invention as described in claim 13, is an image display unit for performing an image processing for an inputted image data, taking into account characteristics of a projection plane, wherein the image display unit includes a storage unit for storing a plurality of correction curves, which are generated by repeating a method for generating the correction curve with respect to a plurality of projection plane, including: a measuring step of measuring a reflection characteristic for each color component of an output provided from the image display unit and reflected by a predetermined projection plane and a reflection characteristic for each color component of the output provided from the image display and reflected by a reference projection plane; and a correction curve generating step of generating a correction curve for correcting the inputted image data so as to eliminate a difference between the measured reflection characteristic for each color component reflected by the predetermined projection plane and a reflection characteristic for each color component reflected by a reference projection plane.

The present invention as described in claim 14, is an image display unit according to claim 10, wherein the amount of correction of input image data corrected by the correction curve(s) is adjustable.

The present invention as described in claim 15, is an image display unit according to claim 10, wherein the correction curve(s) is subjected to a rounding process in a high graduation region.

The present invention as described in claim 16, is an image display unit according to claim 15, wherein the degree of the rounding process is adjustable.

The present invention as described in claim 17, is an image display unit according to claim 12, including a selection unit of selecting one correction curve from among the plural correction curves on the basis of a reflection characteristic for each color component reflected by a projection plane, and wherein an image processing is performed for input image data on the basis of the selected correction curve.

According to the present invention as described in claim 18, an image display unit according to claim 17, further includes a unit of inputting the reflection characteristic for each color component reflected by the projection plane in the selection unit.

According to the present invention as described in claim 19, an image display unit according to claim 17, further includes a unit of measuring the reflection characteristic for each color component reflected by the projection plane in the selection unit.

The present invention as described in claim 20, is a computer-readable medium having a program of instructions for execution by the computer to perform an image processing for image data inputted to an image display unit, taking into account characteristics of a projection plane with an output from the image display unit projected thereon, wherein the image processing corrects input image data by using a correction curve for eliminating a difference between a reflection characteristic for each color component of an output provided from the image display unit and reflected by a predetermined projection plane and a reflection characteristic for each color component of the output provided from the image display and reflected by a reference projection plane.

The present invention as described in claim 21, is a computer-readable medium according to claim 20, which uses a plurality of correction curves for a plurality of projection planes.

The present invention as described in claim 22, is a computer-readable medium according to claim 20, wherein the amount of correction of input image data corrected by the correction curve(s) is adjustable.

The present invention as described in claim 23, is a computer-readable medium according to claim 20, wherein the correction curve(s) is subjected to a rounding process in a high graduation region.

The present invention as described in claim 24, is a computer-readable medium according to claim 23, wherein the degree of the rounding process is adjustable.

The present invention as described in claim 25, is a computer-readable medium according to claim 21, including a selection processing of selecting one correction curve from among the plural correction curves on the basis of a reflection characteristic for each color component reflected by a projection plane, and wherein an image processing is performed for input image data on the basis of the selected correction curve.

According to the present invention as described in claim 26, a computer-readable medium according to claim 25, further includes a processing of inputting the reflection characteristic for each color component reflected by the projection plane in the selection processing.

According to the present invention as described in claim 27, a computer-readable medium according to claim 25, further includes a processing of measuring the reflection characteristic for each color component reflected by the projection plane in the selection processing.

The present invention as described in claim 28, is a computer-readable medium storing a correction curve for performing an image processing for image data inputted to an image display unit, taking into account characteristics of a projection plane with an output from the image display unit projected thereon, wherein the correction curve eliminates a difference between a reflection characteristic for each color component of an output provided from the image display unit and reflected by a predetermined projection plane and a reflection characteristic for each color component of the output provided from the image display and reflected by a reference projection plane.

The present invention as described in claim 29, is a computer-readable medium according to claim 28, which uses a plurality of correction curves for a plurality of projection planes.

The present invention as described in claim 30, is a computer-readable medium according to claim 28, wherein the amount of correction of input image data corrected by the correction curve(s) is adjustable.

The present invention as described in claim 31, is a computer-readable medium according to claim 28, wherein the correction curve(s) is subjected to a rounding process in a high graduation region.

The present invention as described in claim 32, is a computer-readable medium according to claim 31, wherein the degree of the rounding process is adjustable.

BRIEF DESCRIPTION OF THE DRAWINGS

FIG. 13 is a flow chart for explaining the operation of the image processor 100 in the projector 20 of the third embodiment.

DESCRIPTION OF THE PREFERRED EMBODIMENTS

Preferred embodiments of the present invention will be described hereinunder with reference to the drawings.

First Embodiment

System Configuration

Figure 1:
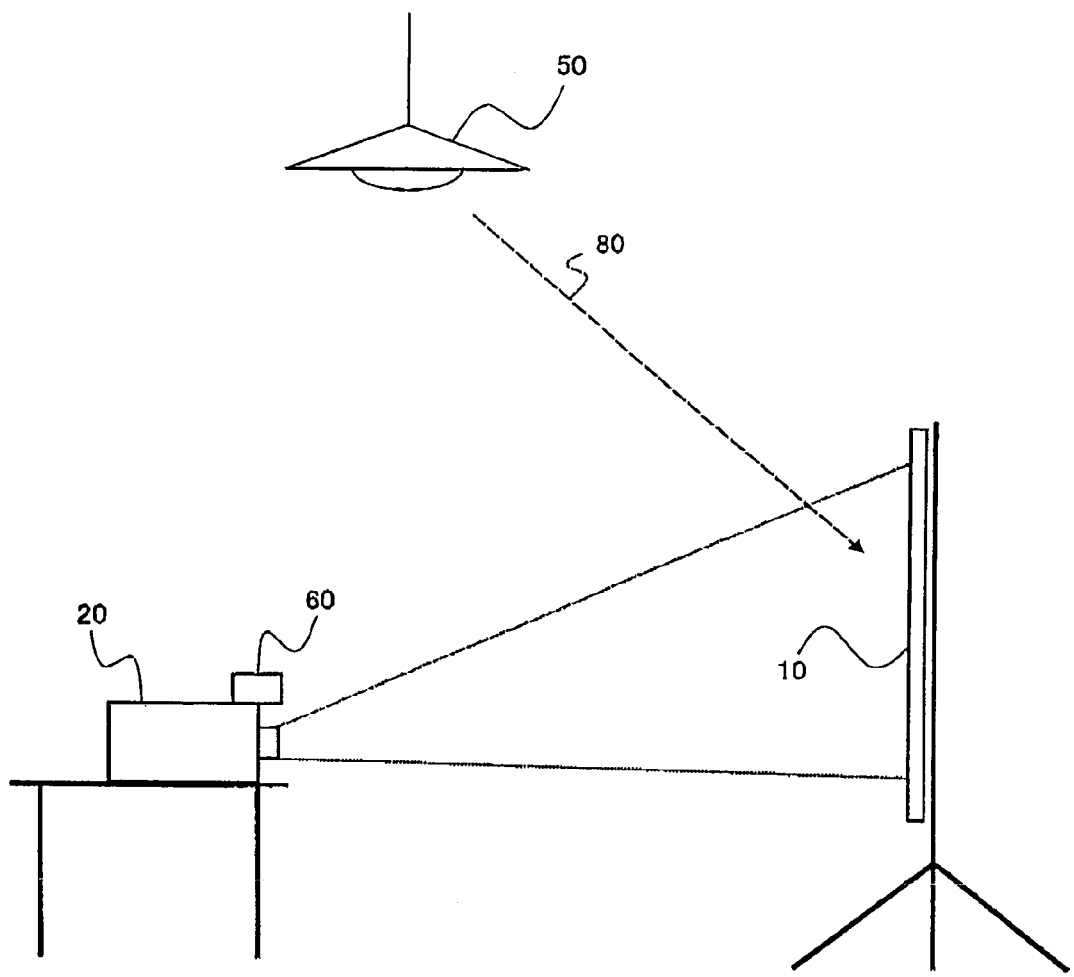
FIG. 1 is a schematic explanatory diagram of a system using a projector 20 according to an embodiment of the present invention.

FIG. 1 is a schematic explanatory diagram of a system using a projector 20 used as an image display unit according to an embodiment of the present invention. As examples of the image display unit according to the present invention, there also are included a CRT and a liquid crystal display in addition to the projector.

A predetermined image is projected from the projector 20 which is disposed substantially in front of a screen 10.

In this case, how the image looks differs greatly depending on the type of the projection plane 10 used. For example, even in case of displaying the same white, the white may look yellowish in a certain type of a projection plane 10.

Figure 2:
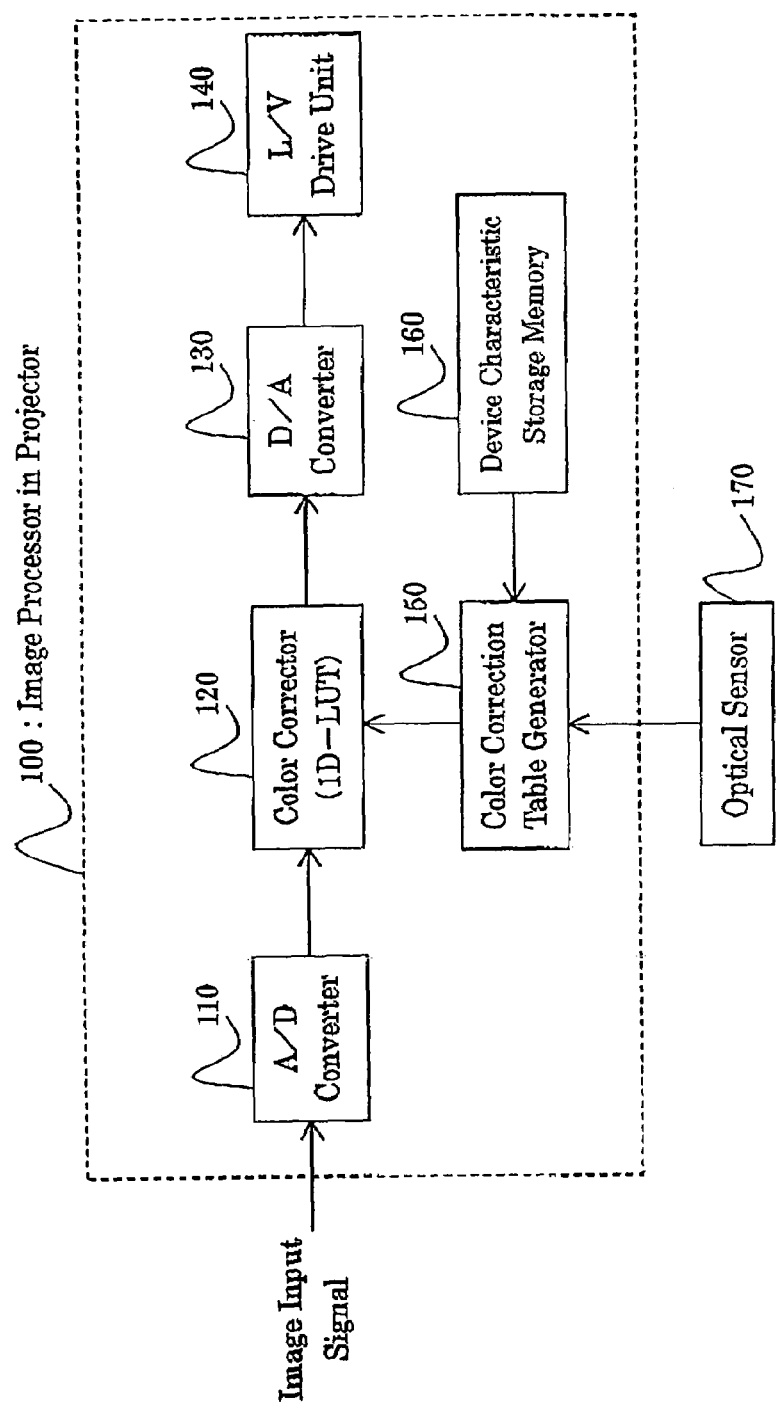
FIG. 2 is a functional block diagram of an image processor 100 used in the projector 20 of the first embodiment.

FIG. 2 is a functional block diagram of an image processor 100 installed in the projector 20 of the first embodiment.

The image processor 100 in the projector of the first embodiment is provided with an A/D converter 110 for converting an analog image input signal into a digital signal, a color corrector 120 which applies a one-dimensional color correction table to RGB image input signals to make a desired color correction, a D/A converter 130 for converting a digital signal to an analog signal, a L/V (light valve) drive unit 140 for actuating a liquid crystal light valve to make a projection display of image, a device characteristic storage memory 160 for storing a device projector) characteristic, an optical sensor 170 for measuring the luminance of light emitted from the projector and reflected by the screen and an external illumination reflected by the screen, and a color correction table generator 150 which generates a color correction table taking the influence of external illumination into account on the basis of both the device characteristic stored in the device characteristic storage memory 160 and a colorimetric value provided from the optical sensor 170.

In the projector according to the present invention, an analog image input signal fed from a personal computer for example is converted to a digital image signal by the A/D converter 110. Then, by the color corrector 120, a desired color correction is applied to the digital image signal thus resulting from the conversion with reference to the color correction table generated by the color correction table generator 150 and taking the influence of the color of a projection plane used into account. The color-corrected digital image signal is then converted to an analog signal by the D/A converter 130. On the basis of the analog signal thus resulting from the conversion the L/V drive unit 140 actuates a liquid crystal light valve to make a projection display of image.

Operation of the Image Processor 100

Next, the operation of the image processor 100 in the projector 20 of the first embodiment will be described below with reference to FIG. 3. Such a processing as a color correction table generation/rewrite processing by the image processor 100, which will be described below, is performed by executing an image processing program stored in a program storage unit (not shown) in the projector 20. The program storage unit constitutes a medium which stores the image processing program. The image processing program itself is included in the scope of the present invention.

First, before using the projector 20 according to the present invention, R (red), G (green), B (blue), and bk (black) colors are outputted to a reference projection plane from the projector (image display unit) 20 in a dark surround and a luminance value of reflected light of each such color output reflected by the reference projection plane is measured by the optical sensor 170 for example and is stored in the device characteristic storage memory 160 (step 202). As the reference projection plane there may be selected a projection plane whose reflectance in the visible light region is close to 1, such as a standard diffusion plate.

A color correction table generation/rewrite processing is performed by the color correction table generator 150 (step 204). As to the color correction table generation/rewrite processing, it will be described in detail below with reference to FIG. 4.

After the color correction table generation/rewrite processing, there is made image display with reference to the rewritten color correction table and on the basis of the image signal which has been color-corrected by the color corrector 120 (step 206). If the image display is not terminated (step 208, No) and if a certain time has not elapsed after the end of the last-time color correction table generation/rewrite processing (step 210, No), the state of image display in step 206 continues. On the other hand, if the image display is not terminated (step 208, No) and if a certain time has elapsed from the end of the last-time color correction table generation/rewrite processing (step 210, Yes), the color correction table generation/rewrite processing is again performed taking into account the case where the projection plane is changed (step 204) and there is made image display (step 206). According to the present invention, since the color correction table is rewritten at every certain time taking a change of projection plane into account, an appropriate color reproduction is ensured even if the projection plane changes.

If the image display is terminated, for example by turning OFF a power supply of the projector (step 208, Yes), the processing is ended.

Color Correction Table Generation/Rewrite Processing

Figure 3:
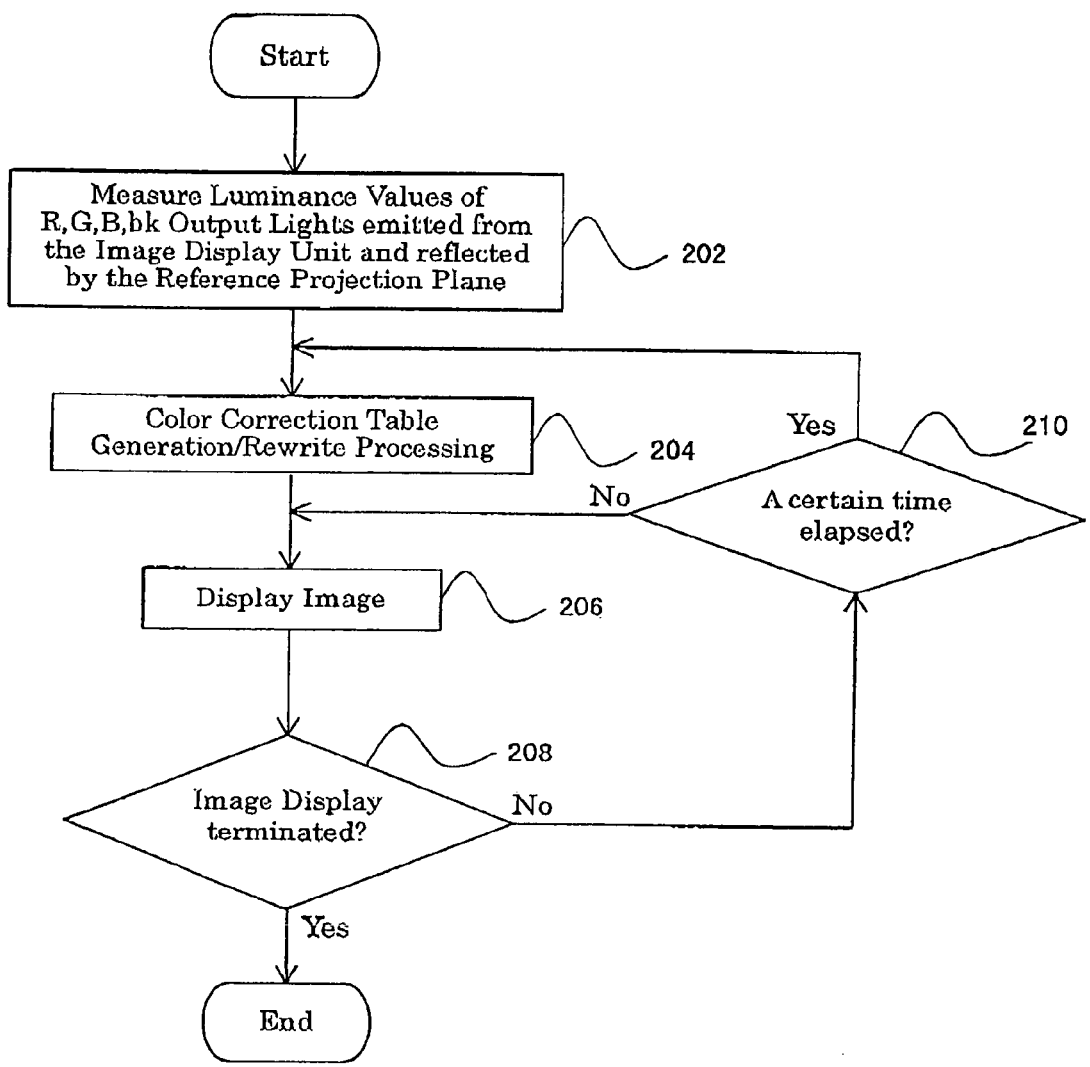
FIG. 3 is a flow chart for explaining the operation of the image processor 100 in the projector 20 of the first embodiment.
Figure 4:
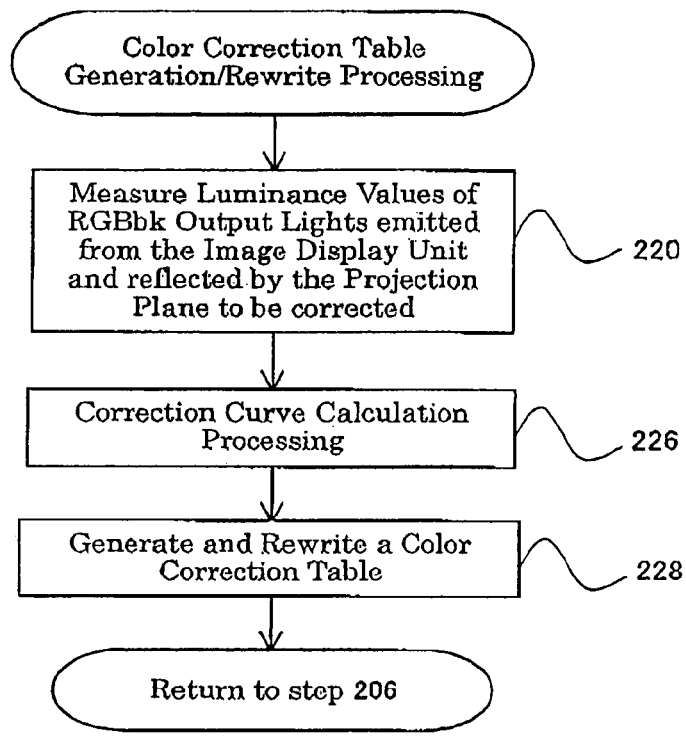
FIG. 4 is a flow chart for explaining a color correction table generation/rewrite processing executed by a color correction table generator 150 in the projector 20 of the first embodiment.

Next, with reference to FIG. 4, the following description is provided about the color correction table generation/rewrite processing (the processing of step 204 in FIG. 3) which is performed by the color correction table generator 150 in the projector 20 of the first embodiment.

In the color correction table generation/rewrite processing, R (red), G (green), B (blue), and bk (black) colors are outputted to a projection plane to be corrected and a luminance value of reflected light of each such color output reflected by the projection plane is measured by the optical sensor 170, e.g., a radiospectroluminance meter, (step 220).

Next, a correction curve calculation processing is performed (step 226). As to the correction curve calculation processing, it will be described below in detail with reference to FIG. 5. On the basis of a calculated correction curve there is generated a new one-dimensional color correction curve. Then, the one-dimensional color correction table which is referenced to by the color corrector 120 is rewritten by the newly generated one-dimensional color correction table (step 228) and the processing flow returns to step 206.

Correction Curve Calculation Processing

Figure 5:
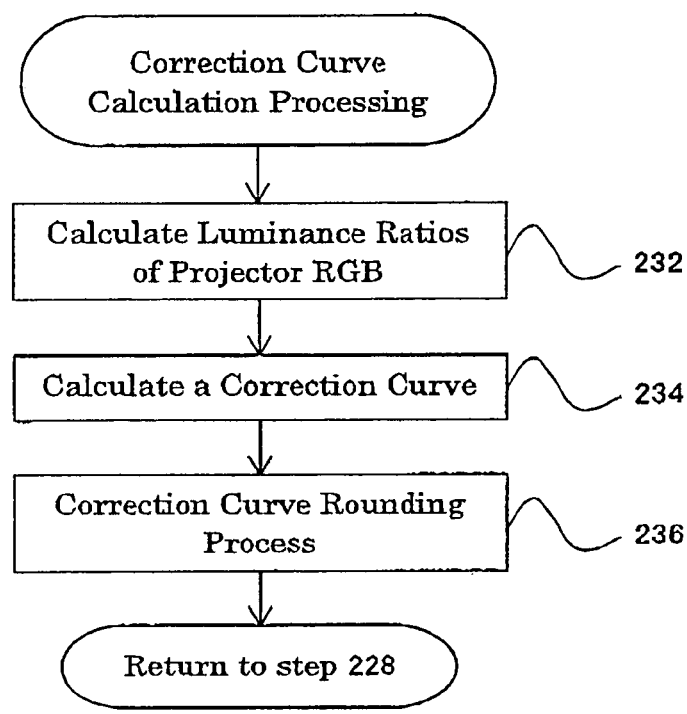
FIG. 5 is a flow chart for explaining a correction curve calculation processing executed by the color correction table generator 150 in the projector 20 of the first embodiment.

Next, with reference to FIG. 5, a description will be given about the correction curve calculation processing (the processing of step 226 in FIG. 4) which is performed by the color correction curve generator 150 in the projector 20 of this embodiment. A correction curve is determined in the following manner on the basis of the measured values obtained in steps 202 in FIG. 3 and step 220 in FIG. 4.

In the correction curve calculation processing, first luminance ratios of RGB colors on projection planes are calculated on the basis of the measured values obtained in step 202 of FIG. 3 and step 220 of FIG. 4 (step 232), which calculation is performed in accordance with the following equations:

$$y_R = (Y_R - Ybk)/(Y_G - Ybk) \quad (1)$$

$$y_G = (Y_G - Ybk)/(Y_G - Ybk) = 1 \quad (2)$$

$$y_B = (Y_B - Ybk)/(Y_G - Ybk) \quad (3)$$

In the above equations, $Y_R$, $Y_G$, $Y_B$, and Ybk represent luminances of R, G, B, and bk colors in the projector and $y_R$, $y_G$, and $y_B$ represent luminance ratios of RGB. In this case, $y_G$ is always 1 because the ratios are based on the luminance of G. Luminance ratios $y_{R0}$, $y_{G0}$, and $y_{B0}$ of RGB on the reference projection plane are also calculated in the same manner.

Next, a correction curve is calculated (step 234). Primary colors (RGB) in the projector are not influenced by a change in chromaticity caused by a change of projection plane in comparison with secondary and tertiary colors. Therefore, if the luminance ratios $y_R$, $y_G$, and $Y_B$ of the projection plane concerned are corrected so as to coincide with the luminance ratios $y_{R0}$, $y_{G0}$, and $y_{B0}$ of the reference projection plane, a change in chromaticity caused by a difference of projection plane is corrected in all colors. If digital input values of RGB before correction are normalized in the range of 0 to 1 as $D_R$in, $D_G$in, and $D_B$in, respectively, and digital input values of RGB after correction are normalized in the range of 0 to 1 as $D_R$out, $D_G$out, and $D_B$out, respectively, there are obtained the following correction curve equations:

$$D_R\text{out} = [y_R'/\max(y_R', y_G', y_B')]^{1/\gamma} \times D_R\text{in}, y_R' = y_{R0}/y_R \quad (4)$$

$$D_G\text{out} = [y_G'/\max(y_R', y_G', y_B')]^{1/\gamma} \times D_G\text{in}, y_G' = y_{G0}/y_G = 1 \quad (5)$$

$$D_B\text{out} = [y_B'/\max(y_R', y_G', y_B')]^{1/\gamma} \times D_B\text{in}, y_B' = y_{B0}/y_B \quad (6)$$

In the above equations, $\max(y_R', y_G', Y_B')$ represent maximum values of $y_R'$, $y_G'$, and $y_B'$, respectively. In this way, a change in chromaticity caused by a difference of projection plane can be corrected colorimetrically.

Figure 6:
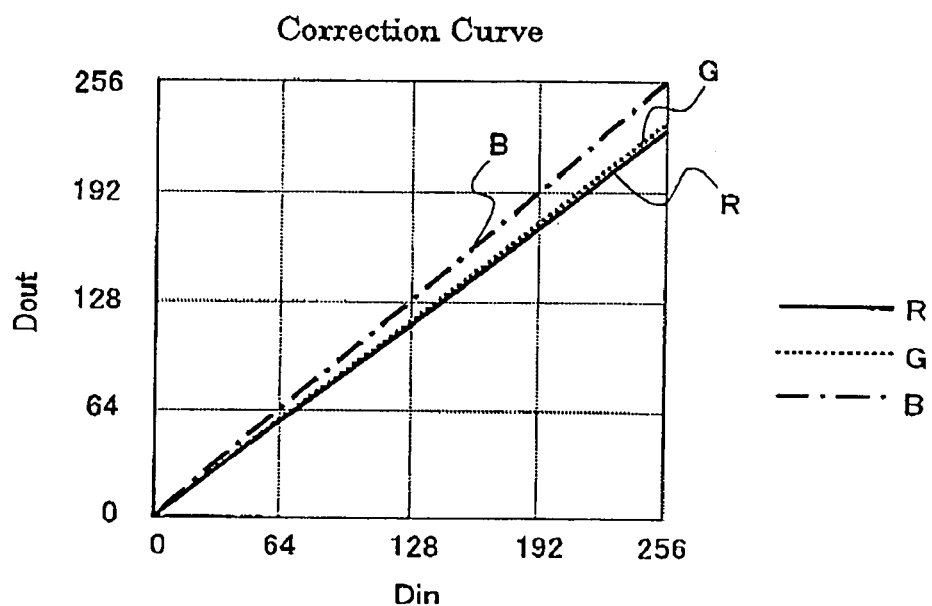
FIG. 6 is a graph showing a correction curve before subjected to a rounding process.
Figure 7:
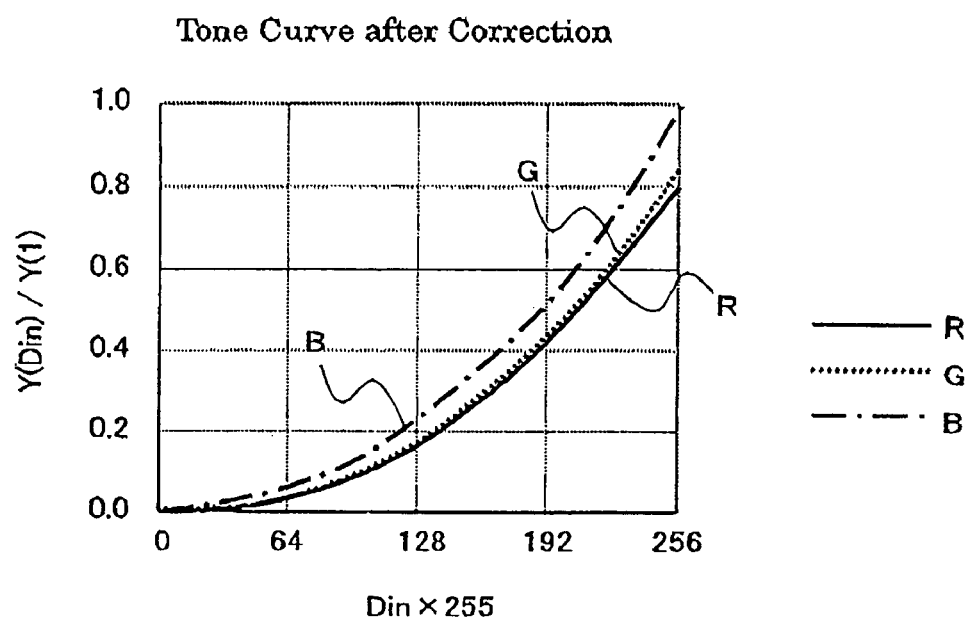
FIG. 7 is a graph showing a tone curve characteristic after correction.

An example of correction curve thus obtained and an example of tone curve characteristic after correction are shown in FIGS. 6 and 7, respectively.

It is thus possible to correct colorimetrically a change in chromaticity caused by a difference of projection plane, but in case of adjusting the amount of correction, $\alpha$ ($0 < \alpha < 1$), taking the adaptability of the human eyes and the effect of contrast into account, there are obtained the following correction curve equations:

$$D_R\text{out} = [1 - \alpha\{1 - y_R'/\max(y_R', y_G', y_B')\}]^{1/\gamma} \times D_R\text{in} \quad (7)$$

$$D_G\text{out} = [1 - \alpha\{1 - y_G'/\max(y_R', y_G', y_B')\}]^{1/\gamma} \times D_G\text{in} \quad (8)$$

$$D_B\text{out} = [1 - \alpha\{1 - y_B'/\max(y_R', y_G', y_B')\}]^{1/\gamma} \times D_B\text{in} \quad (9)$$

If the color of the projection plane obtained by measurement is corrected 100% ($\alpha = 1$), an exact correction is performed colorimetrically. In the presence of an external illumination, however, since the color of the projection plane is present around a projected image, the correction looks as if it were stronger than the actual correction due to a color contrast between the projected image and the projection plane and the effect of the eyes' adaptability to the external illumination. The amount of correction is adjusted to eliminate such a phenomenon. It is necessary that the amount of correction, $\alpha$, be adjusted while the evaluation of image is made actually under each environment. The value of $\alpha$ is preferably in the range of 0.5 to 1.0.

Next, a correction curve rounding process is executed (step 236).

In the correction curve thus obtained and shown in FIG. 6, with only any of RGB colors, the maximum luminance (luminance of white) in the projector becomes lower than that before correction because there is used only a part of the output range available of the device. Therefore, the maximum luminance state before correction is maintained by rounding the correction curve in the vicinity of a high gray scale. More specifically, the amount of correction, $\Delta D = Din - Dout$, is decreased as follows:

$$\Delta D \to \Delta D \times F(Din)$$

$$F(Din) = \{(Din - D')/(1 - D')\}^\theta \quad (D' \leq Din \leq 1) \quad (10)$$
$$= 1 \quad (0 \leq Din \leq D')$$

Figure 8:
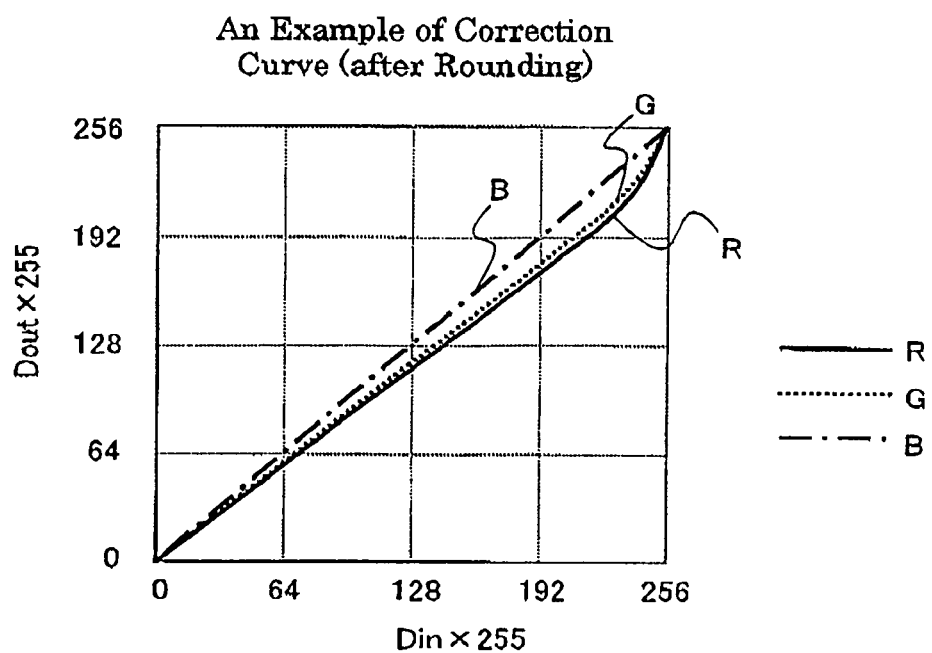
FIG. 8 is a diagram for explaining a correction curve rounding process.

According to this transformation, as the input gradation Din approaches 1, the amount of correction $\Delta D$ approaches 0 and the maximum luminance is maintained. In the above equation (10), $\theta$ and D' are parameters which indicate the strength of the rounding process. The smaller the value of $\theta$ or the larger the value of D', the more strongly is rounded the correction curve. The values of $\theta$ and D' are preferably about 5 and about 0.75, respectively. In FIG. 8 there is shown a relation between Dout and Din after the rounding process.

Second Embodiment

Figure 9:
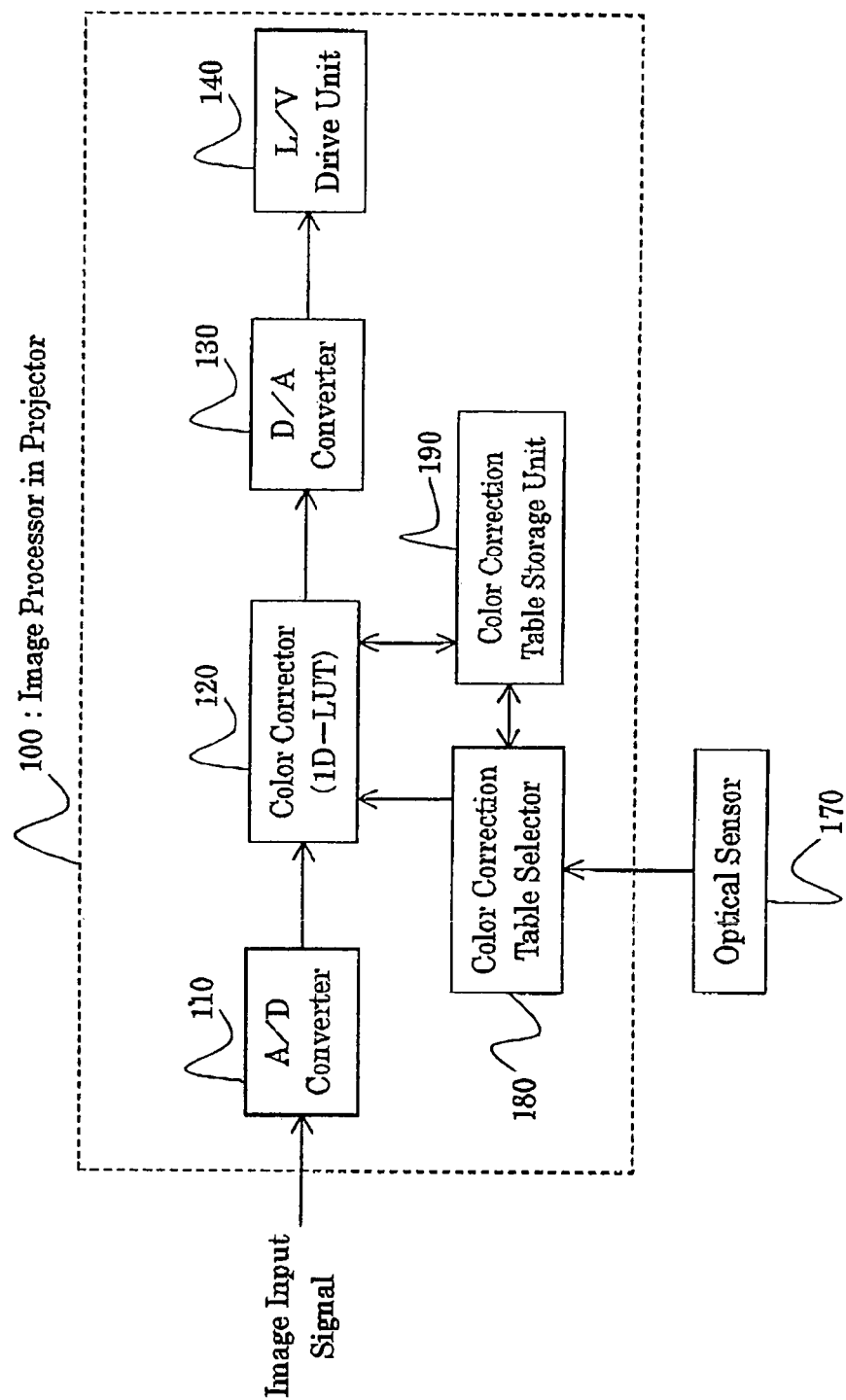
FIG. 9 is a functional block diagram of an image processor 100 used in a projector 20 according to the second embodiment of the present invention.

FIG. 9 is a functional block diagram of an image processor 100 installed in a projector 20 according to the second embodiment of the present invention, in which the same components as in the first embodiment are identified by the same reference numerals as in the first embodiment.

The image processor 100 in the projector of this second embodiment, like the first embodiment, is also provided with an A/D converter 110 for converting an analog image input signal into a digital signal, a color corrector 120 which applies a one-dimensional color correction table to RGB image input signals to make a desired color corrections a D/A converter 130 for converting a digital signal into an analog signal, and a L/V (light valve) drive unit 140 for actuating a liquid crystal light valve to make a projection display of image.

The image processor 100 in the projector of this second embodiment is further provided with a color correction table storage unit 190 for storing color correction tables generated for plural projection planes and a color correction table selector 180 which, on the basis of colorimetric values provided from the optical sensor 170, selects a suitable color correction table from among the color correction tables stored in the color correction table storage unit 190.

In the projector of this second embodiment, like the first embodiment, color correction tables generated by the same correction curve calculation processing are stored beforehand in the color correction table storage unit 190, and at the time of actual image display the color correction table selector 180 selects an appropriate color correction table in accordance with a colorimetric value provided from the optical sensor. On the basis of the color correction table thus selected the color corrector 120 applies a desired color correction which takes the influence of external illumination into account to a digital image input signal. The thus color-corrected digital image input signal is converted to an analog signal by the D/A converter 130, and in accordance with the analog signal thus obtained, the L/V drive unit 140 actuates a liquid crystal light valve to make a projection display of image.

Color Correction Table Generation/Storage Processing

Figure 10:
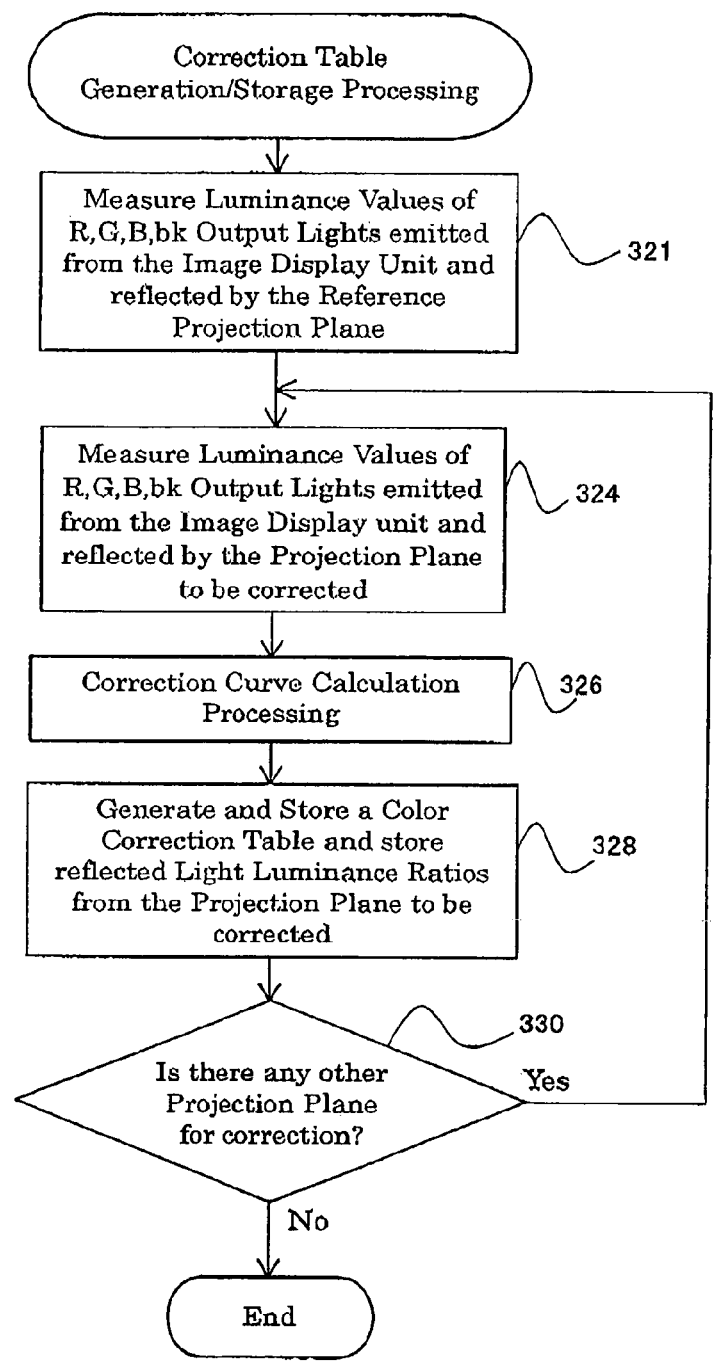
FIG. 10 is a flow chart for explaining a color correction table generation/storage processing performed by a color correction table generator 150 and a color correction table storage unit 190 both installed in the projector 20 of the second embodiment.

Next, with reference to FIG. 10, a description will be given below about a color correction table generation/storage processing for generating a color correction table and storing it into the color correction table storage unit 190.

In the color correction table generation/storage processing, R red), G (green), B (blue), and bk (black) colors are outputted to the reference projection plane from the projector (image display unit) 20 and reflected light luminance values of such color outputs from the reference projection plane are measured by the optical sensor 170 for example (step 321). Then, R (red), G (green), B (blue), and bk (black) colors are outputted from the projector (image display unit) 20 to the projection plane to be corrected and reflected light luminance values of such color outputs from the projection plane are measured by the optical sensor 170 for example (step 324).

Then, the same correction curve calculation processing as in the first embodiment is performed on the basis of the measured values obtained in steps 321 and 324 (step 326). Further, a one-dimensional color correction table is generated on the basis of the thus-calculated correction curve, and the one-dimensional color correction table thus generated and luminance ratios of reflected lights from the projection plane to be corrected, which have been calculated from the measured values obtained in step 324 for generating the correction curve and in accordance with the equations (1) to (3), are stored in the color correction table storage unit 190 (step 328).

The processings of steps 324 to 328 are repeated for another projection plane to be corrected (step 330).

Operation of the Image Processor 100

Figure 11:
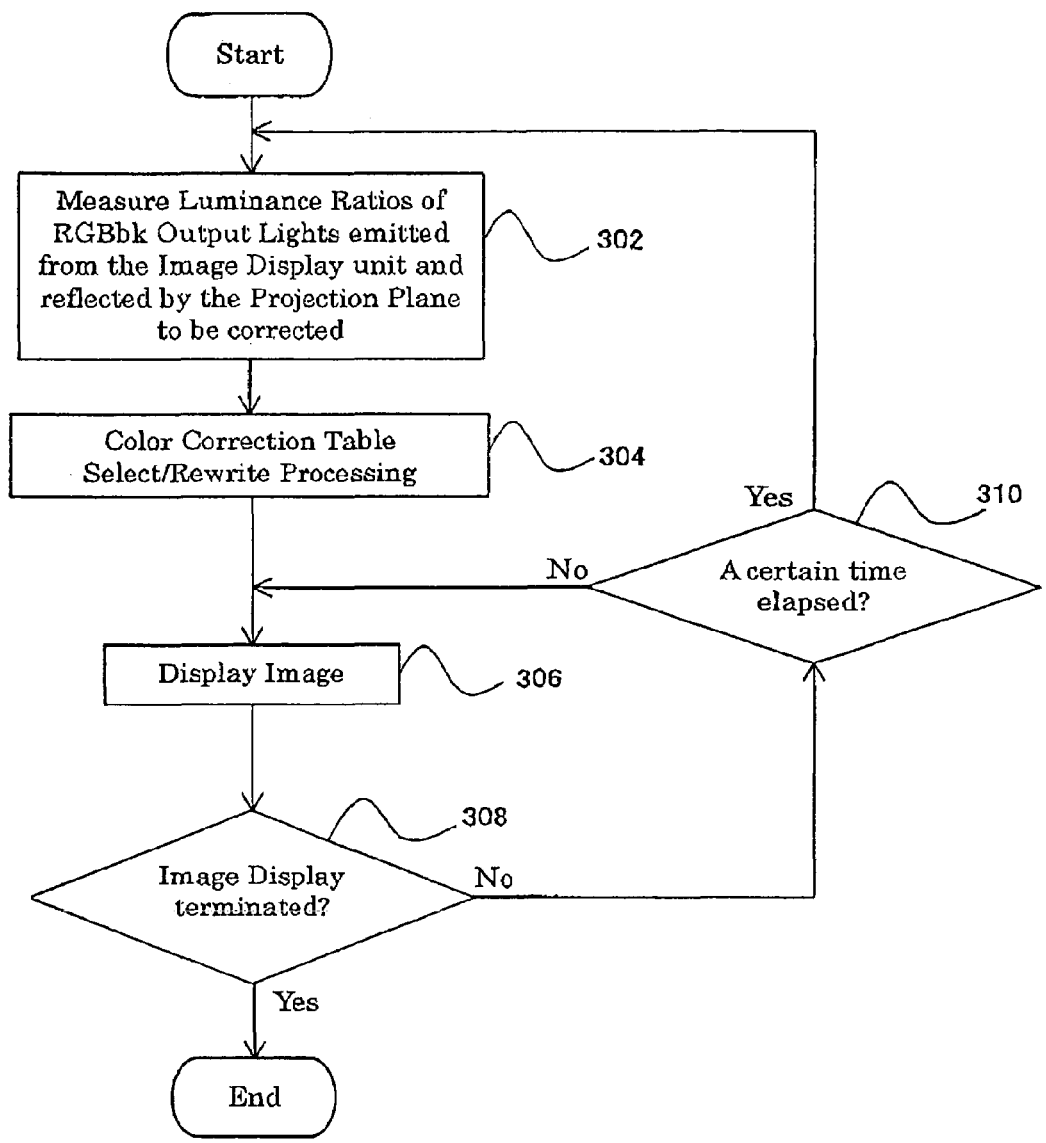
FIG. 11 is a flow chart for explaining the operation of the image processor 100 in the projector 20 of the second embodiment.

Next, with reference to FIG. 11, the following description is provided about the operation of the image processor 100 installed in the projector 20 of this second embodiment. The processing by the image processor 100, which will be described below, is carried out by executing an image processing program stored in a program storage unit (not shown) of the projector as in the first embodiment. The program storage unit constitutes a medium which stores the image processing program. Further, the image processing program itself is also included in the scope of the present invention.

First, when the use of the projector 20 is started, R red), G (green), B (blue), and bk (black) colors are outputted from the projector (image processing unit) 20 to the projection plane to be corrected and reflected light luminance values of such color outputs from the projection plane are measured by the optical sensor 170. Then, luminance ratios of the reflected lights from the projection plane are obtained from the thus-measured luminance values and in accordance with the equations (1) to (3) (step 302).

Next, the color correction table selector 180 refers to the reflected light luminance ratios stored in the color correction table storage unit 190, then selects from the color correction table storage unit 190 a corresponding color correction table generated for reflected light luminance ratios closest to the luminance ratios obtained in step 302 and informs the color corrector 120 of the corresponding color correction table. The color corrector 120 reads out the corresponding color correction table from the color correction table storage unit 190 and makes rewrite into the corresponding color correction table (step 304).

After the color correction table select/rewrite processing, there is made image display with reference to the rewritten color correction table and in accordance with the image signal color-corrected by the color corrector 120 (step 306). In this case, if the image display is not terminated (step 308, No) and if a certain time has not elapsed from the end of the last-time color correction table select/rewrite processing (step 310, No), the state of image display in step 306 continues. On the other hand, if the image display is not terminated (step 308, No) and if a certain time has elapsed from the end of the last-time color correction table select/rewrite processing (step 310, Yes), the measurement of reflected light from the screen 10 (step 302) and the color correction table select/rewrite processing (step 304) are again performed taking into account the case where the projection plane is changed, and there is made image display (step 306). According to the present invention, since the color correction table is rewritten at every certain time while taking a change of projection plane into account, an appropriate color reproduction is ensured even if the color of projection plane changes.

In the case where the image display is terminated, for example by turning OFF a power supply of the projector (step 308, Yes), the processing is ended.

Third Embodiment

Figure 12:
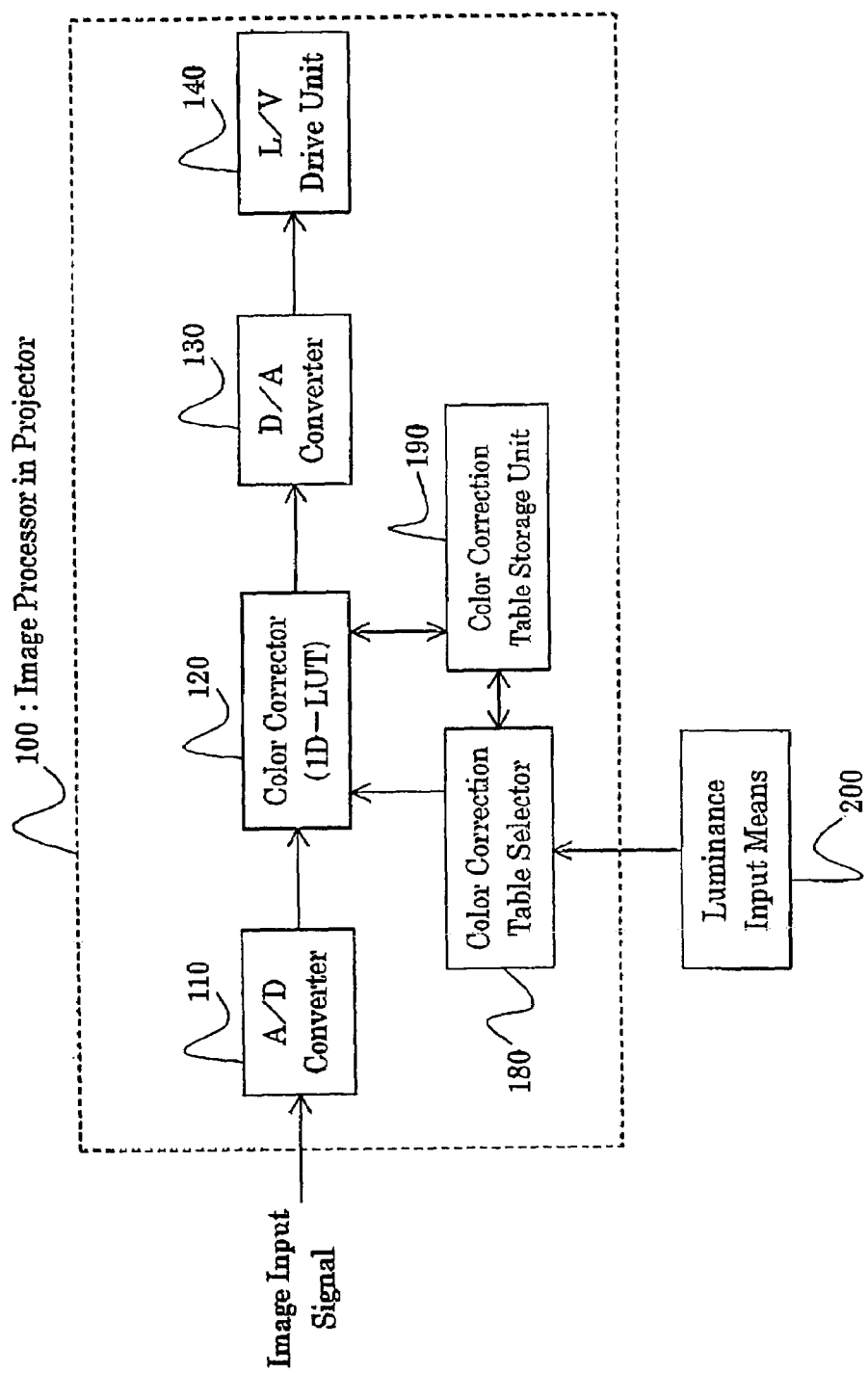
FIG. 12 is a functional block diagram of an image processor 100 used in a projector 20 according to the third embodiment of the present invention.
Figure 18:
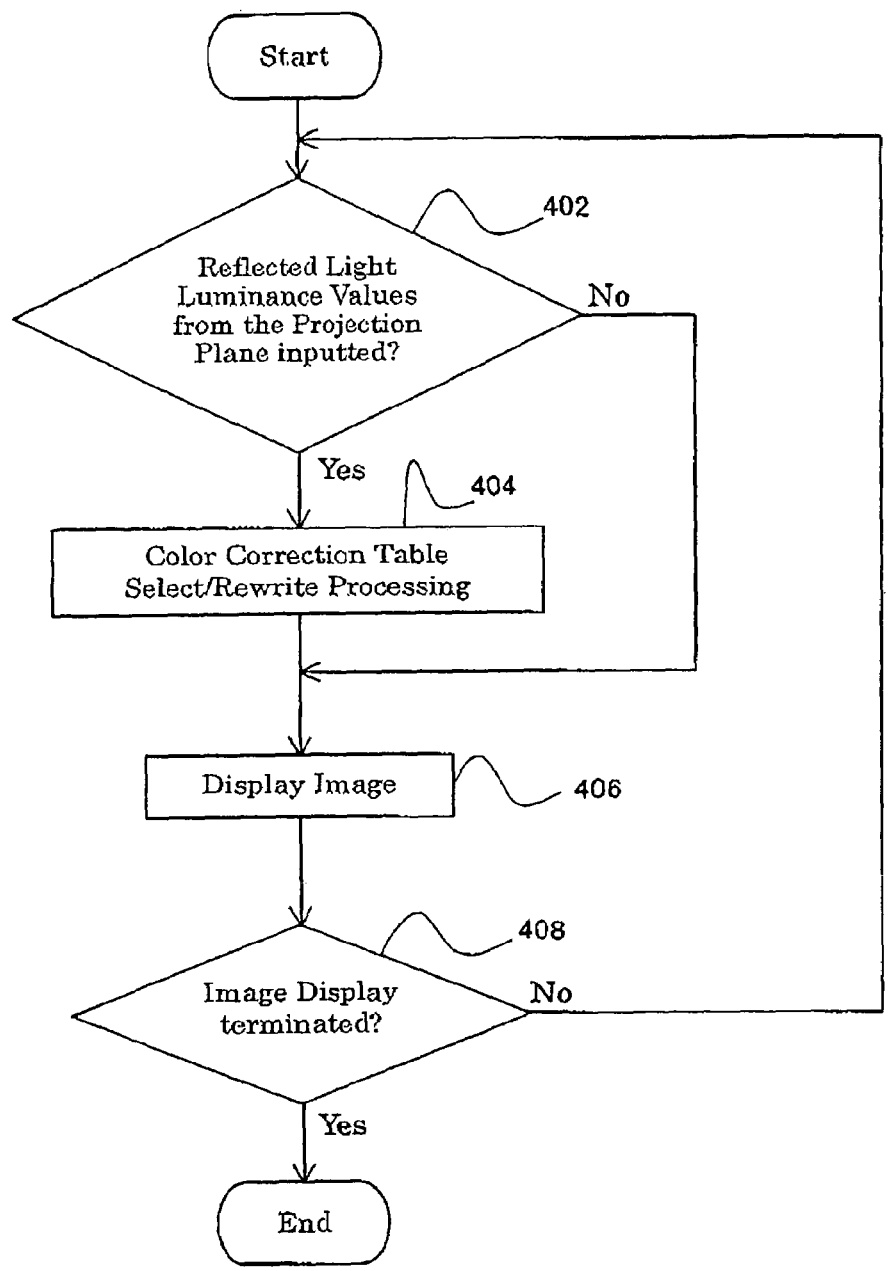

FIG. 12 is a functional block diagram of an image processor 100 installed in a projector 20 according to the third embodiment of the present invention, in which the same components as in the first and second embodiments are identified by the same reference numerals as in those previous embodiments.

The image processor 100 in the projector of this third embodiment, like the second embodiment, is also provided with an A/D converter 110 for converting an analog image input signal to a digital signal, a color corrector 120 for applying a one-dimensional color correction table to RGB image input signals to make a desired color correction, a D/A converter 130 for converting a digital signal to an analog signal, a L/V (light valve) drive unit 140 for actuating a liquid crystal light valve to make a projection display of image, a color correction table storage unit 190 for storing color correction tables for plural projection planes, and a correction table selector 180 for selecting a suitable color correction table from among the color correction tables stored in the color correction table storage unit 190.

The image processor 100 in the projector of this third embodiment is different from the image processor used in the second embodiment in that (1) it is further provided with a luminance input means 200 for inputting a luminance value of reflected light from the projection plane to be corrected and in that (2) the color correction table selector 180 selects a suitable color correction table from among the color correction tables stored in the color correction table storage unit 190 on the basis of reflected light luminance values inputted from the luminance input means 200.

As to the color correction table generation/storage processing, it is the same as in the second embodiment, so an explanation thereof will here be omitted.

Operation of the Image Processor 100

Next, with reference to FIG. 13, a description will be given below about the operation of the image processor 100 in the projector 20 of this third embodiment.

The following processing by the image processor 100 is carried out by executing an image processing program stored in a program storage unit (not shown) in the projector 20 as in the first and second embodiments. The program storage unit constitutes a medium which stores the image processing program. The image processing program itself is included in the scope of the present invention.

The operation of the image processor 100 in the projector 20 of this third embodiment is basically the same as in the second embodiment.

In the previous second embodiment, in step 302, reflected light luminance values from the projection plane are measured at every certain time by the optical sensor 170 and the color correction table selector 180 selects from the color correction table storage unit 190 a corresponding color correction table generated for luminance values closest to the measured reflected light luminance values.

This third embodiment is different from such second embodiment in that, in step 402, reflected light luminance values from the projection plane to be corrected are inputted by the luminance input means 200 and the color correction table selector 180 refers to the reflected light luminance values stored in the color correction table storage unit 190 and selects from the color correction table storage unit 190 a corresponding color correction table generated for luminance ratios closest to the luminance ratios obtained from the inputted luminance values in accordance with the equations (1) to (3).

When reflected light luminance values from the projection plane to be corrected are inputted by the luminance input means 200 (step 402, Yes), the color correction table selector 180 informs the color corrector 120 of a corresponding color correction table. The color corrector 120 reads out the corresponding color correction table from the color correction table storage unit 190 and makes rewrite into the corresponding color correction table (step 404). Then, the display of image is performed with reference to the rewritten color correction table and on the basis of an image signal color-corrected by the color corrector 120 (step 406).

On the other hand, in the case where reflected light luminance values from the projection plane are not inputted by the luminance input means 200 (step 402, No), the display of image is performed without rewrite of the color correction table (step 406).

The above steps 402 to 406 are repeated until the image display is terminated, for example by turning OFF a power supply of the projector (step 408).

What is claimed is:

1. A method for generating a correction curve for correcting image data inputted to an image display unit, taking into account characteristics of a projection plane on which an output from said image display unit is projected, said method comprising:
   a measuring step of measuring a reflection characteristic for each color component of an output provided from said image display unit and reflected by a predetermined projection plane and a reflection characteristic for each color component of the output provided from said image display and reflected by a reference projection plane; and
   a correction curve generating step of generating a correction curve for correcting the inputted image data so as to eliminate a difference between the measured reflection characteristic for each color component reflected by the predetermined projection plane and a reflection characteristic for each color component reflected by a reference projection plane.

2. An image processing method for image data inputted to an image display unit, taking into account characteristics of a projection plane with an output from said image display unit projected thereon, wherein said method corrects input image data by using a correction curve for eliminating a difference between a reflection characteristic for each color component of an output provided from said image display unit and reflected by a predetermined projection plane and a reflection characteristic for each color component of the output provided from said image display and reflected by a reference projection plane.

3. An image processing method according to claim 2, which uses a plurality of correction curves for a plurality of projection planes.

4. An image processing method according to claim 2, wherein the amount of correction of input image data corrected by said correction curve(s) is adjustable.

5. An image processing method according to claim 2, wherein said correction curve(s) is subjected to a rounding process in a high graduation region.

6. An image processing method according to claim 5, wherein the degree of said rounding process is adjustable.

7. An image processing method according to claim 3, including a selection step of selecting one correction curve from among said plural correction curves on the basis of a reflection characteristic for each color component reflected by a projection plane, and wherein an image processing is performed for input image data on the basis of the selected correction curve.

8. An image processing method according to claim 7, further including a step of inputting the reflection characteristic for each color component reflected by the projection plane in said selection step.

9. A image processing method according to claim 7, further including a step of measuring the reflection characteristic for each color component reflected by the projection plane in said selection step.

10. An image display unit for performing an image processing for an inputted image data, taking into account characteristics of a projection plane, wherein said image display unit corrects input image data by using a correction curve for eliminating a difference between a reflection characteristic for each color component of an output provided from said image display unit and reflected by a predetermined projection plane and a reflection characteristic for each color component of the output provided from said image display and reflected by a reference projection plane.

11. An image display unit for performing an image processing for an inputted image data, taking into account characteristics of a projection plane, wherein the image display unit performs the image processing for the inputted data based on a correction curve, which is sequentially generated by sequentially repeating a method for generating the correction curve comprising:
  a measuring step of measuring a reflection characteristic for each color component of an output provided from said image display unit and reflected by a predetermined projection plane and a reflection characteristic for each color component of the output provided from said image display and reflected by a reference projection plane; and
  a correction curve generating step of generating a correction curve for correcting the inputted image data so as to eliminate a difference between the measured reflection characteristic for each color component reflected by the predetermined projection plane and a reflection characteristic for each color component reflected by a reference projection plane.

12. An image display unit according to claim 10, which uses a plurality of correction curves for a plurality of projection planes.

13. An image display unit for performing an image processing for an inputted image data, taking into account characteristics of a projection plane, wherein the image display unit comprises a storage means for storing a plurality of correction curves, which are generated by repeating a method for generating the correction curve with respect to a plurality of projection plane, comprising:
  a measuring step of measuring a reflection characteristic for each color component of an output provided from said image display unit and reflected by a predetermined projection plane and a reflection characteristic for each color component of the output provided from said image display and reflected by a reference projection plane; and
  a correction curve generating step of generating a correction curve for correcting the inputted image data so as to eliminate a difference between the measured reflection characteristic for each color component reflected by the predetermined projection plane and a reflection characteristic for each color component reflected by a reference projection plane.

14. An image display unit according to claim 10, wherein the amount of correction of input image data corrected by said correction curve(s) is adjustable.

15. An image display unit according to claim 10, wherein said correction curve(s) is subjected to a rounding process in a high graduation region.

16. An image display unit according to claim 15, wherein the degree of said rounding process is adjustable.

17. An image display unit according to claim 12, including a selection means of selecting one correction curve from among said plural correction curves on the basis of a reflection characteristic for each color component reflected by a projection plane, and wherein an image processing is performed for input image data on the basis of the selected correction curve.

18. An image display unit according to claim 17, further including a means of inputting the reflection characteristic for each color component reflected by the projection plane in said selection means.

19. An image display unit according to claim 17, further including a means of measuring the reflection characteristic for each color component reflected by the projection plane in said selection means.

20. A computer-readable medium having a program of instructions for execution by the computer to perform an image processing for image data inputted to an image display unit, taking into account characteristics of a projection plane with an output from said image display unit projected thereon, wherein said image processing corrects input image data by using a correction curve fox eliminating a difference between a reflection characteristic for each color component of an output provided from said image display unit and reflected by a predetermined projection plane and a reflection characteristic for each color component of the output provided from said image display and reflected by a reference projection plane.

21. A computer-readable medium according to claim 20, which uses a plurality of correction curves for a plurality of projection planes.

22. A computer-readable medium according to claim 20, wherein the amount of correction of input image data corrected by said correction curve(s) is adjustable.

23. A computer-readable medium according to claim 20, wherein said correction curve(s) is subjected to a rounding process in a high graduation region.

24. A computer-readable medium according to claim 23, wherein the degree of said rounding process is adjustable.

25. A computer-readable medium according to claim 21, including a selection processing of selecting one correction curve from among said plural correction curves on the basis of a reflection characteristic for each color component reflected by a projection plane, and wherein an image processing is performed for input image data on the basis of the selected correction curve.

26. A computer-readable medium according to claim 25, further including a processing of inputting the reflection characteristic for each color component reflected by the projection plane in said selection processing.

27. A computer-readable medium according to claim 25, further including a processing of measuring the reflection characteristic for each color component reflected by the projection plane in said selection processing.

28. A computer-readable medium storing a correction curve for performing an image processing for image data inputted to an image display unit, taking into account characteristics of a projection plane with an output from said image display unit projected thereon, wherein said correction curve eliminates a difference between a reflection characteristic for each color component of an output provided from said image display unit and reflected by a predetermined projection plane and a reflection characteristic for each color component of the output provided from said image display and reflected by a reference projection plane.

29. A computer-readable medium according to claim 28, which uses a plurality of correction curves for a plurality of projection planes.

30. A computer-readable medium according to claim 28, wherein the amount of correction of input image data corrected by said correction curve(s) is adjustable.

31. A computer-readable medium according to claim 28, wherein said correction curve(s) is subjected to a rounding process in a high graduation region.

32. A computer-readable medium according to claim 31, wherein the degree of said rounding process is adjustable.

* * * * *